United States Patent [19]

Walsh

[11] Patent Number: 5,600,470
[45] Date of Patent: Feb. 4, 1997

[54] MIXED FIBER ADAPTER CABLE

[75] Inventor: Peter J. Walsh, Colorado Springs, Colo.

[73] Assignee: Hewlett-Packard Co, Palo Alto, Calif.

[21] Appl. No.: 80,378

[22] Filed: Jun. 21, 1993

[51] Int. Cl.$^6$ ...................................................... H04B 10/00
[52] U.S. Cl. ............................ 359/152; 359/173; 385/89
[58] Field of Search ..................................... 359/143, 152, 359/173, 179, 125, 133, 118; 385/24, 88–89, 105, 110; 370/24; 379/414; 178/63 R; 455/81

[56] References Cited

U.S. PATENT DOCUMENTS

| | | | |
|---|---|---|---|
| 4,778,239 | 10/1988 | Shaw et al. | 385/24 |
| 4,784,453 | 11/1988 | Shaw et al. | 385/24 |

FOREIGN PATENT DOCUMENTS

| | | | |
|---|---|---|---|
| 3105068 | 9/1982 | Germany | 359/118 |
| 0264323 | 10/1989 | Japan | 359/152 |
| 9109478 | 6/1991 | WIPO | 359/118 |

Primary Examiner—Wellington Chin
Assistant Examiner—Kinfe-Michael Negash
Attorney, Agent, or Firm—Cynthia S. Baan

[57] ABSTRACT

Disclosed is a mixed fiber adapter cable, which is capable of performing direct data transfers from a multi-mode transceiver of a first FDDI node and a single-mode transceiver of a second FDDI node. The mixed fiber adapter cable comprises a multi-mode graded index optical fiber and a single-mode step index optical fiber. The multi-mode graded index fiber conducts an optical signal from an LED source of a multi-mode FDDI connector/transceiver combination to a photodetector receiver of a single-mode connector/transceiver. Conversely, the single-mode step index fiber conducts an optical signal from a laser source of a single-mode FDDI connector/transceiver combination to a photodetector receiver of the multi-mode connector/transceiver at the other end. This adapter cable is possible because the photodetectors of both the single-mode transceiver and the multi-mode transceiver accept optical input from either source with corresponding fiber type. Thus, the mixed fiber adapter cable will permit laser signals to be transmitted from the single-mode transceiver to the multi-mode transceiver and light signals to be transmitted from the multi-mode transceiver to the single-mode transceiver.

7 Claims, 9 Drawing Sheets

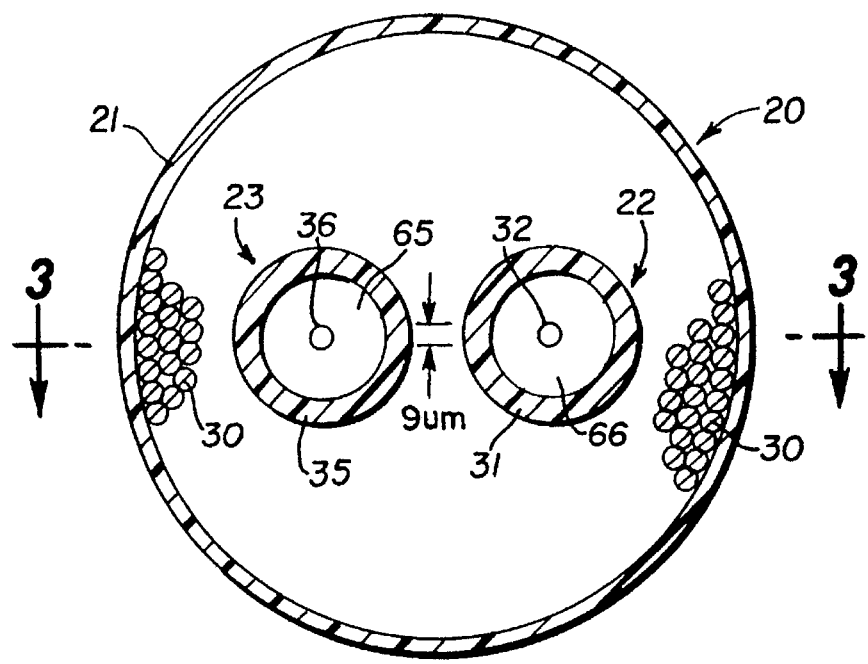
FIG.2 *(PRIOR ART)*
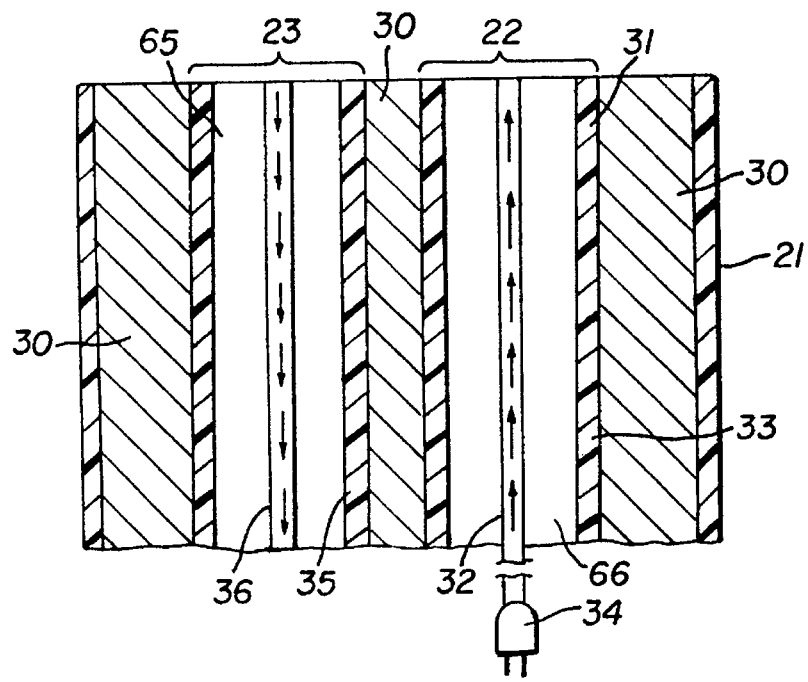
FIG.3 *(PRIOR ART)*

MIXED FIBER ADAPTER CABLE

FIELD OF THE INVENTION

This invention relates generally to the field of fiber optics and more particularly to the field of fiber optic cables. Specifically, the present invention pertains to a mixed fiber optic cable adapter cable, which enables single-mode to multi-mode communication and multi-mode to single-mode communication.

BACKGROUND OF THE INVENTION

Computer terminals within a system or organization are generally interconnected by some type of network, which allows data to be transmitted and received between the many elements (i.e. computer terminals, main frame, printers, etc.) of the network to communicate with each other. One particular type of network is a fiber distribution data interface or FDDI, which uses fiber optic cables and transceivers to create a network of computer terminals, printers and a mainframe. There are two types of FDDI cables, single-mode and multi-mode. As will be explained more specifically below, single-mode FDDI cable networks are more expensive and are generally used for long distance communication, usually for distances between 2 and 20 kilometers, and multi-mode FDDI cable networks are used for short distance communication, usually less than 2 Km.

FIGS. 1–3 illustrate a typical single-mode FDDI cable. Referring now to FIG. 1, a single-mode cable 20 is shown which includes optic fibers 22 and 23 surrounded by aramid yarns 30 for strength and an outer jacket 21 for protection. Cable 20 has a first end 37 and a second end 38. First end 37 of cable 20 is connected to a single-mode fixed shroud duplex transceiver connector 39. As is well known in the art, connector 39 is "keyed" or connectorized by elements 24. A single-mode communication transceiver (not shown) of FDDI node 1 is receptively "keyed" or connectorized such that the transceiver of node 1 will only allow the connection of a single-mode cable connector. The single-mode connectorization between the transceiver of a node and the connector of a cable is a well-known ANSI standard. Single-mode cable 20 is mounted in connector 39 so that optic fiber 22 is optically coupled through fiber termination 26 of connector 39 to a laser diode (not shown) that is in the communication transceiver of node 1 and optic fiber 23 is optically coupled through fiber termination 28 of connector 39 to a photodetector (not shown) that is in the communication transceiver of node 1.

A second end 38 of single-mode cable 20 is connected to a single-mode fixed shroud duplex transceiver connector 40, which is "keyed" or connectorized by elements 25. A single-mode communication transceiver (not shown) of FDDI node 2 is receptively "keyed" or connectorized such that the communication transceiver of FDDI node 2 will only allow the connection of a single-mode cable connector. The second end 38 of cable 20 is coupled to connector 40 such that optic fiber 22 is optically coupled through a fiber termination 29 of connector 40 to a photodetector (not shown) in the transceiver of node 2 and optic fiber 23 is optically coupled through a fiber termination 27 of connector 40 to a laser diode transmitter (not shown) in the transceiver of node 2.

During a data transfer from node 1 to node 2, a laser diode in the transceiver of node 1 emits a laser beam signal that is transmitted into the optic fiber 22 at end 26 of connector 39. The laser beam signal then propagates through optic fiber 22 and is received at the other end at fiber termination 29 of connector 40, which couples the laser beam signal to a photodetector in the transceiver of node 2. The signal is then converted by opto-electronic circuitry (not shown) in node 2's transceiver to a form that can be "read" by node 2. In a similar data transfer from node 2 to node 1, a laser in the transceiver of node 2 emits a laser beam signal that is transmitted into optic fiber 23 via fiber end 27 of connector 40. The laser beam signal then propagates through optic fiber 23 and is received at the other end at fiber termination 28 of connector 39, which couples the laser beam signal to a photodetector in the transceiver of node 1. The signal is then converted by opto-electronic circuitry (not shown) in node 1's transceiver to a form that can be "read" by node 1.

FIG. 2 shows a lateral cut-away view of single-mode cable 20 and FIG. 3 shows a longitudinal cut-away view of a short segment of single-mode cable 20. Referring now to FIGS. 2 and 3, cable 20 includes two optical fibers 22 and 23, which are made up of fiber optic cores 32 and 36 surrounded by optical cladding layers 65 and 66 and mechanically strippable plastic layers 31 and 35, respectively. The fiber optic cores 32 and 36 are each 9 microns in diameter. Optic fibers 22 and 23 are surrounded by aramid yarns 30 for strength and an outer jacket 21 for protection. Optic fibers 22 and 23 transmit coherent light, such as light 33 emitted from laser diode 34. Single-mode fiber optic cables, such as cable 20, are capable of conducting coherent light signals up to about 16 or 20 kilometers, and therefore are used for transmitting data between remote FDDI nodes. Technically, single-mode fiber optic cables could also be used for close range transmission of data, such as between computers within a single office. However, the high cost of single-mode communication transceivers (approximately $1,200.00) generally prohibits such use.

FIGS. 4–6 illustrate a typical multi-mode FDDI optic cable 41. Referring now to FIG. 4, a multi-mode cable 41 is shown which includes optic fibers 43 and 44 surrounded by aramid yarns 53 for strength and an outer jacket 42 for protection. Cable 41 has a first end 54 and a second end 55. The first end 54 of cable 41 is mounted in a multi-mode fixed shroud duplex transceiver connector 52. As is well known in the art, multi-mode connector 52 is "keyed" or connectorized by elements 45. A multi-mode communication transceiver (not shown) of FDDI node 3 is receptively "keyed" or connectorized such that the transceiver of node 3 will only allow the connection of a multi-mode cable connector. The multi-mode connectorization between the transceiver of a node and the connector of a cable is a well-known ANSI standard.

Multi-mode cable 41 is mounted in connector 52 in such a manner that optic fiber 43 is optically coupled through fiber termination 47 of connector 52 to a light emitting diode (LED) (not shown) that is in the communication transceiver of node 3 and optic fiber 44 is optically coupled through fiber termination 49 of connector 52 to a photodetector (not shown) that is in the communication transceiver of node 3.

A second end 55 of multi-mode cable 41 is mounted in a multi-mode fixed shroud duplex transceiver connector 51, which is "keyed" or connectorized by elements 46. A multi-mode communication transceiver (not shown) of FDDI node 4 is receptively "keyed" or connectorized such that the communication transceiver of FDDI node 4 will only allow the connection of a multi-mode cable connector. The second end 55 of cable 41 is mounted in connector 51 in such a manner that optic fiber 43 is optically coupled through fiber termination 50 of connector 51 to a photodetector (not shown) in the transceiver of node 4 and optic fiber 44 is optically coupled through fiber termination 48 of connector 51 to a light emitting diode (LED) (not shown) in the transceiver of node 4.

During a data transfer from node 3 to node 4, the LED (not shown) in the transceiver of node 3 emits a light beam signal that is transmitted to optic fiber 43 via fiber termination 47 of connector 52. The light beam signal then propagates through optic fiber 43 and is received at the opposite end of optic fiber 43 at fiber termination 50 of connector 51, which couples the light beam signal to the photodetector (not shown) in the transceiver of node 4. The light signal is then converted by opto-electronic circuitry (not shown) in node 4's transceiver to a form that can be "read" by node 4. In a similar data transfer from node 4 to node 3, the LED in the transceiver of node 4 emits a light beam signal that is transmitted through into optic fiber 44 at fiber termination 48 of connector 51. The light beam signal then propagates through optic fiber 44 and is received at the opposite end of optic fiber 44 at fiber termination 49 of connector 52, which couples the light beam signal to the photodetector (not shown) in the transceiver of node 3. The light signal is then converted by opto-electronic circuitry (not shown) in node 3's transceiver to a form that can be "read" by node 3.

FIG. 5 shows a lateral cut-away view of multi-mode cable 41 and FIG. 6 shows a longitudinal cut-away view of a short segment of multi-mode cable 41. Referring now to FIGS. 5 and 6, cable 41 includes two optic fibers 43 and 44 that are made up of fiber optic cores 62 and 63, which are surrounded by optical cladding layers 56 and 57 and mechanically strippable plastic layers 58 and 59, respectively. Optic fibers 43 and 44 are surrounded by aramid yarns 53 for strength and an outer jacket 42 for protection.

The fiber optic cores 62 and 63, through which the light travels, are each 62.5 microns in diameter and are made up of many concentric layers of glass with different indexes of refraction, higher indexes towards the center, lower indexes toward the outside. As is well known in the art, light travels faster in a lower index of refraction material. The light entering a multi-mode optic fiber with graded-index of refraction at angles other than zero end up taking a longer path than light that enters at an angle close to zero. Therefore, the light that takes a longer path spends more of its time in the faster lower indexes of refraction glass and arrives closer to the same time as the light that traveled straight through. These properties of the multi-mode fiber help reduce multi-path dispersion or pulse spreading that occurs with non-coherent light sources.

Optic fibers 43 and 44 conduct non-coherent light, such as light emitted from a light emitting diode 60. Therefore, because of the pulse spreading, multi-mode fiber optic cables are only capable of transmitting light signals a distance of up to about 2 kilometers. For this reason, multi-mode cables are used for transmitting data signals between local FDDI nodes, such as nodes within a single office building or within a campus or office park environment. Most FDDI system owners/managers would prefer to use multi-mode communication paths whenever possible, since multi-mode transceivers, at approximately $150.00, are much less expensive than single-mode transceivers, at approximately $1,200.00.

Given the above overview of multi-mode and single-mode FDDI communication systems, it will be readily apparent that the inexpensive multi-mode communication system is generally used whenever possible for communications between FDDI nodes. However, when the distance between FDDI nodes exceeds 2 kilometers, the data transfers must be accomplished via a single-mode FDDI communication system.

FIG. 7 shows a schematic diagram of a typical FDDI network 69 which has a local site 70 with nodes 10, 11, 2, and 13 and a distant site 71 with nodes 14, 15, 16, and 17. As will be noted by reference to FIG. 7, each FDDI node 11 to 17 has an A transceiver and a B transceiver. An A transceiver of a first node must be connected to media compatible type B transceiver of a second node, and vice versa. For example, local node 10 of network 69 has a single-mode (S) transceiver A that is connected via a 2–20 kilometer single-mode (S) cable 72 to a single-mode (S) B transceiver of distant node 17. Similarly, node 10 has a multi-mode (M) B transceiver that is connected by a multi-mode cable (M) 73 of 2 kilometers or less to a multi-mode (M) A transceiver of local node 11. Likewise, each node in network 69 is connected to two other nodes by FDDI cables 72 to 79 with the mode (i.e., single-mode (S) or multi-mode(M)) of the transceivers and connecting cables being determined by the distance between the nodes being connected (i.e., less than or greater than 2 kilometers). Although it is possible to change the transceivers of a node from a multi-mode transceiver to a single-mode transceiver, or vice versa, for cost reasons, the transceivers A and B of a node are generally permanent.

It should be noted that a laser source is incompatible with multi-mode fiber, because too much optical energy would be coupled into the fiber which would saturate or overdrive the photodetector at the other end of the fiber. Moreover, an LED source is incompatible with single-mode fiber, because too little optical energy would be coupled into the fiber and the signal at the other end would be too weak for the photodetector to receive. In addition, the optical fiber used with an LED source must be constructed with concentric layers of glass with a graded index of refraction in order to reduce multi-path dispersion or pulse stretching. For these reasons, laser sources must launch their signal into a single-mode fiber and LED sources must launch their signal into a multi-mode fiber. Accordingly, transceivers and cable connectors are connectorized or "keyed" so that only a single-mode FDDI cable may be coupled to a laser transceiver and only a multi-mode FDDI cable may be coupled to an LED transceiver. Once a node's transceiver is established as either multi-mode or single-mode, it is also established that the node can only communicate through that transceiver with a node having a similar type transceiver.

The primary problem with FDDI nodes having preset, permanent transceivers and only being able to communicate with like-mode transceivers is just that—a node's single-mode transceiver cannot be directly connected to a multi-mode transceiver of a second node, and vice versa. This problem may arise when a network analyzer (also known as a network advisor or a protocol analyzer) has to be inserted into the network ring. For example, if a network analyzer was inserted into the ring between nodes 10 and 17 to analyze the communications between the two nodes, the connection would require a second single-mode cable and the network analyzer would need to have two single-mode transceivers, because node 10 and 17 are communicating with each other via a single-mode communication media. However, if the network analyzer was then inserted into the ring between nodes 10 and 11 to analyze the communications between those two nodes, the connection would require a second multi-mode cable and the network analyzer would need to have two multi-mode transceivers, because nodes 10 and 11 are communicating with each other via a multi-mode communication media.

The present situation is costly; in order to be capable of analyzing a FDDI network ring along any given point, a network analyzer must be equipped with two single-mode transceivers, two multi-mode transceivers, a single-mode cable, and a multi-mode cable. As would be readily apparent, a network analyzer with four transceivers must also have additional circuitry to allow for switching between and enabling of the transceivers, etc. Clearly, such an analyzer is not only costly, but also bulky and not readily portable, which is a disadvantage as an analyzer must be transported to any location in a network that needs to be analyzed.

One solution that addresses the size and portability of a network analyzer, but not the cost has been the use of communication "pods", one for single-mode communication and one for multi-mode communication. Each pod contains two transceivers, both either single-mode or multi-mode. If a network technician knows that he will be testing a network between two single-mode nodes, he inserts a single-mode pod into the network analyzer and if he will be testing a network between two multi-mode nodes, he inserts a multi-mode pod. As stated previously, this solution addresses the overall size of the analyzer, but not the cost, since a network analyzer must still be equipped with four transceivers and two cables. Furthermore, situations may arise where there is a need for direct communication between a single-mode node and a multi-mode node in an FDDI communication network, such as relocation of nodes to different facilities, etc.

Accordingly, there is need in the field of fiber optics for a means of direct communication between single-mode FDDI nodes and multi-mode FDDI nodes. There is further need in the field for a solution to the expensive, redundant need for transceivers in network analyzers and other network inserts. The present invention meets these and other needs.

SUMMARY OF THE INVENTION

It is an object of the present invention to further improve the above described prior art and to provide a fiber optic cable capable of single-mode to multi-mode communications and multi-mode to single-mode communications, which is an inexpensive solution to the above described disadvantages of the prior art.

The above and other objects of the present invention are accomplished by constructing a fiber optic cable having both a multi-mode optic fiber for carrying light signals from a multi-mode transceiver and a single-mode optic fiber for carrying laser signals from a single-mode transceiver.

The present invention provides a simple, inexpensive solution that overcomes the disadvantages and limitations of the prior art as will be better understood by reading the following more particular description of the invention.

BRIEF DESCRIPTION OF THE DRAWINGS

The above and other objects, features, and advantages of the present invention will be better understood by reading the following more particular description of the invention, presented in conjunction with the following drawings, wherein:

FIG. 2 shows a lateral cut-away view of a conventional single-mode FDDI cable;

FIG. 3 shows a longitudinal cut-away view of a conventional single-mode FDDI cable;

DETAILED DESCRIPTION OF THE PRESENT INVENTION

Figure 8:
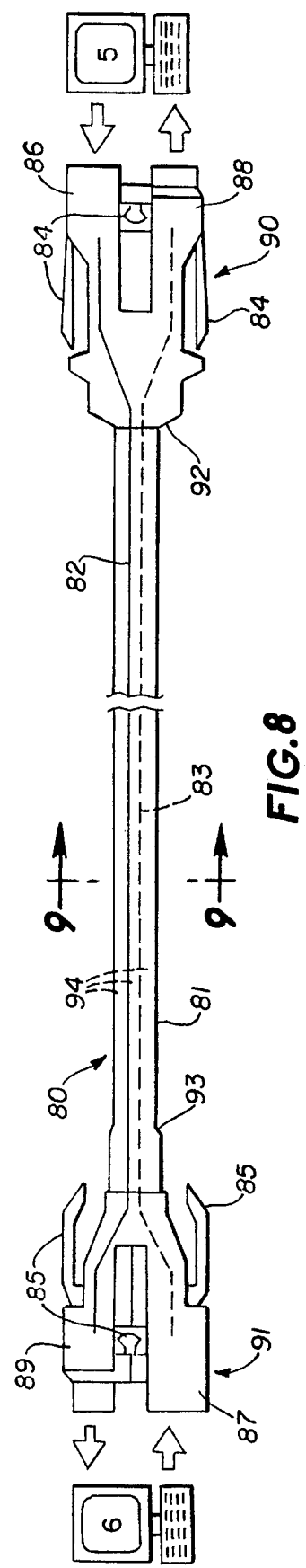
FIG. 8 shows a cross-sectional view of a mixed fiber FDDI cable according to the present invention.
Figure 9:
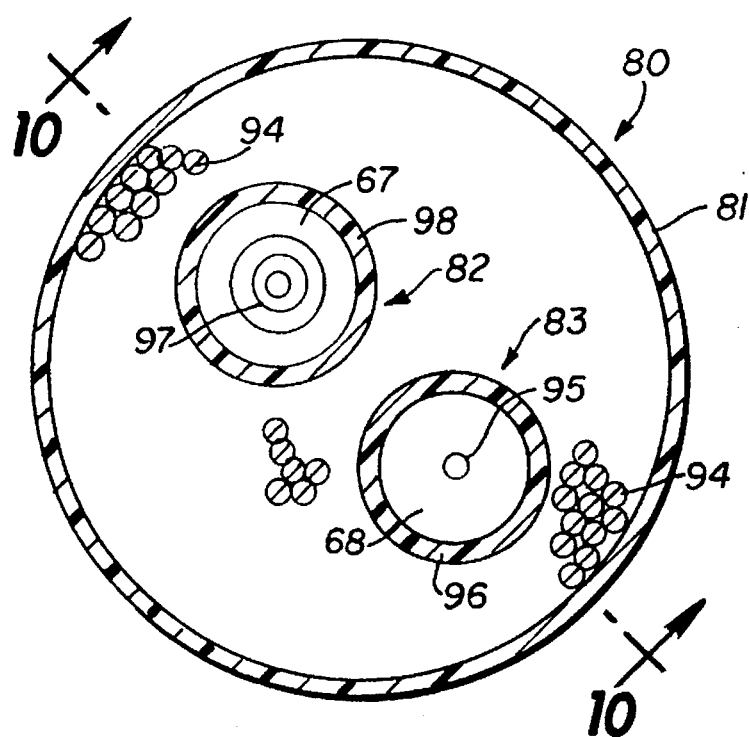
FIG. 9 shows a lateral cut-away view of a mixed fiber FDDI cable according to the present invention.
Figure 10:
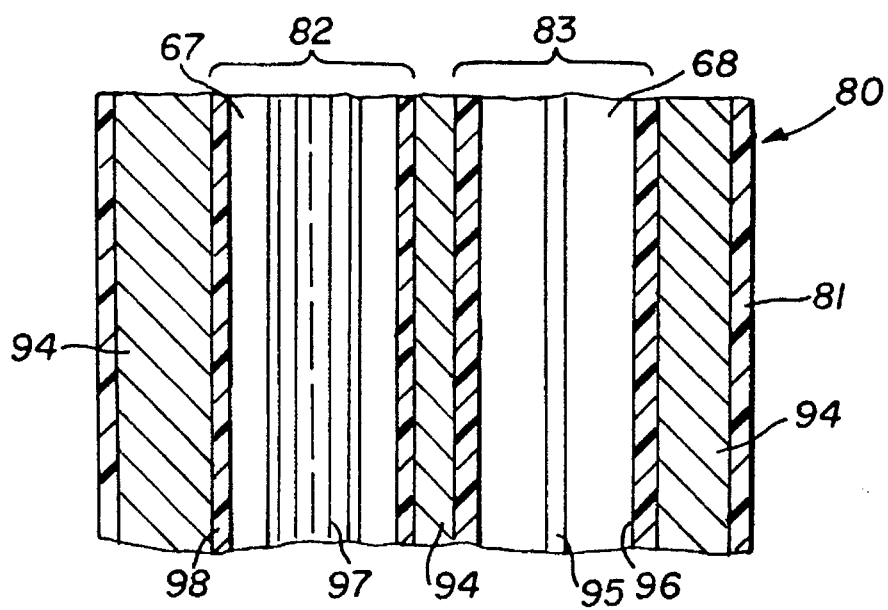
FIG. 10 shows a longitudinal cut-away view of a mixed fiber FDDI cable according to the present invention.

FIGS. 8–10 illustrate a mixed fiber FDDI cable according to the present invention. Referring now to FIG. 8, a mixed fiber cable 80 is shown which includes multi-mode optic fiber 82 and single-mode optic fiber 83, both of which are surrounded by aramid yarns 94 for strength and outer jacket 81 for protection. Cable 80 has a first end 92 and a second end 93. First end 92 of cable 80 is mounted in a multi-mode fixed shroud duplex transceiver connector 90, which is "keyed" or connectorized by elements 84. A multi-mode communication transceiver (not shown) of FDDI node 5 is receptively "keyed" or connectorized such that the transceiver of node 5 will only permit the connection of a multi-mode cable connector. Cable 80 is mounted in connector 90 such that multi-mode fiber 82 is optically coupled through fiber termination 86 of connector 90 to a light emitting diode (not shown) that is in the communication transceiver of FDDI node 5 and single-mode optic fiber 83 is optically coupled through fiber termination 88 of connector 90 to a photodetector (not shown) that is in the communication transceiver of FDDI node 5.

A second end 93 of mixed fiber cable 80 is mounted in a single-mode fixed shroud duplex transceiver connector 91, which is "keyed" or connectorized by elements 85. A single-mode communication transceiver (not shown) of FDDI node 6 is receptively "keyed" or connectorized such that the communication transceiver of FDDI node 6 will only permit the connection of a single-mode cable connector. The second end 93 of cable 80 is mounted in connector 91 such that multi-mode optic fiber 82 is optically coupled through fiber termination 89 of connector 91 to a photodetector (not shown) in the transceiver of node 6 and single-mode optic fiber 83 is optically coupled through fiber termination 87 of connector 91 to a laser diode transmitter (not shown) in the transceiver of node 6.

During a data transfer from node 5 to node 6, a light emitting diode in the transceiver of node 5 emits a light beam signal that is transmitted into optic fiber 82 via fiber end 86 of connector 90. The light beam signal then propagates through multi-mode optic fiber 82 and is received at the other end by fiber termination 89 of connector 91, which couples the light signal to a photodetector (not shown) in the transceiver of node 6. The signal is then converted by opto-electronic circuitry (not shown) in node 6's transceiver to a form that can be "read" by node 6. In a similar data transfer from node 6 to node 5, a laser diode in the transceiver of node 6 emits a laser beam signal that is transmitted into optic fiber 83 via fiber termination 87 of connector 91. The laser beam signal then propagates through single-mode optic fiber 83 and is received at the other end at fiber termination 88 of connector 90, which couples the laser beam signal to a photodetector (not shown) in the transceiver of node 5. The signal is then converted by opto-electronic circuitry (not shown) to a form that can be "read" by node 5.

FIG. 9 shows a lateral cut-away view of mixed fiber cable 80 according to the present invention and FIG. 10 shows a longitudinal cut-away view of mixed fiber cable 80 according to the present invention. Referring now to FIGS. 9 and 10, cable 80 includes to optic fibers 82 and 83. Optic fiber 82 is a multi-mode optic fiber, which transmits non-coherent light (i.e., light from a light emitting diode) and is made up of a fiber optic core 97 surrounded by an optical cladding layer 67 and a mechanically strippable plastic coating 98. Fiber optic core 97 is 62.5 microns in diameter. Optic fiber 83 is a single-mode optic fiber, which transmits coherent light (i.e., light from a laser diode) and is made up of a fiber optic core 95 surrounded by an optical cladding layer 68 and a mechanically strippable plastic coating 96. Fiber optic core 95 is 9 microns in diameter. Optic fibers 82 and 83 are both surrounded by aramid yarns or other strength members 94 and an outer plastic jacket 81 for protection. Outer jacket 81 can be made of a flame retardant material, such as PVC or its equivalent.

As stated earlier, each signal must be launched into its corresponding optic fiber. For example, a laser diode signal must be launched into a single-mode optic fiber, and an LED signal must be launched into a multimode optic fiber. However, the inventor has discovered that multi-mode and single-mode transceivers have substantially identical photodetectors. Therefore, a multi-mode transceiver's photodetector can detect signals from either coherent sources (laser diodes) or non-coherent sources (light emitting diodes), so long as the signals are launched into the correct optic fiber media.

Accordingly, the present invention works by coupling the single-mode optic fiber 83 to fiber termination 87 of the single-mode transceiver connector 91, such that only laser diode signals can be launched into the single-mode optic fiber 83, as the single-mode transceiver connector 91 can only be coupled to a single-mode transceiver. And the multi-mode optic fiber 82 is coupled to fiber termination 86 of the multi-mode transceiver connector 90, such that only light emitting diode signals can be launched into the multimode optic fiber 82, as the multi-mode transceiver connector 90 can only be coupled to a multi-mode transceiver. Since, as stated previously, a multi-mode signal can only propagate effectively for up to 2 kilometers, the length of the mixed fiber cable 80 is constrained to be less than or equal to 2 kilometers.

Figure 11:
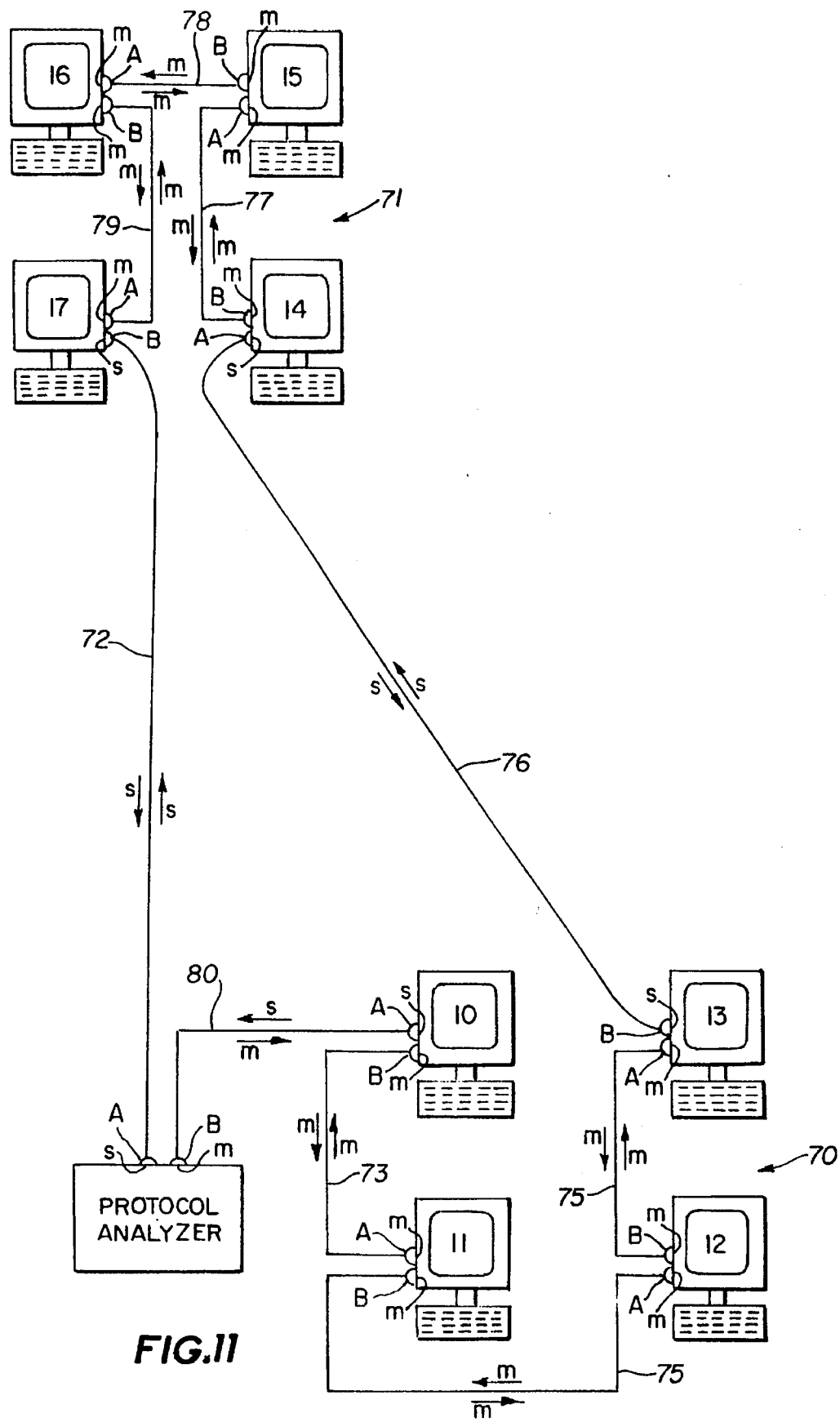
FIG. 11 shows a schematic diagram of a first implementation of a mixed fiber FDDI cable in a network.

FIG. 11 shows a schematic diagram of a FDDI network which has a local site 70 with nodes 10, 11, 12, and 13 and a distant site 71 with nodes 14, 15, 16, and 17. The FDDI network of FIG. 11 is the same network as FIG. 7 except that the network has a Protocol Analyzer inserted between single-mode cable 72 and the single-mode A transceiver of node 10. The Protocol Analyzer has a single-mode (S) transceiver A which is coupled to the single-mode (S) transceiver B of node 17 via the single-mode (S) cable 72 and a multi-mode (M) transceiver B which is coupled to the single-mode (S) transceiver A of node 10 via a mixed fiber cable 80 according to the present invention.

Since the single-mode (S) transceiver A of node 10 must launch its signal into a single-mode optic fiber, the single-mode connector 91 of mixed fiber cable 80 is connected to the single-mode (S) transceiver A of node 10, which permits the laser diode of transceiver A of node 10 to launch laser signals into cable 80 during data transfers from node 80 to the Protocol Analyzer. And since the multi-mode (M) transceiver B of the Protocol Analyzer must launch its signal into a multi-mode optic fiber, the multi-mode connector 90 of mixed fiber cable 80 is connected to the multi-mode (M) transceiver B on the Protocol Analyzer, which permits the light emitting diode of transceiver B of the Protocol Analyzer to launch light signals into cable 80 during data transfers from the Protocol Analyzer to node 10. Accordingly, mixed fiber cable 80 permits direct communication between a single-mode (S) transceiver and a multi-mode (M) transceiver.

Figure 1:
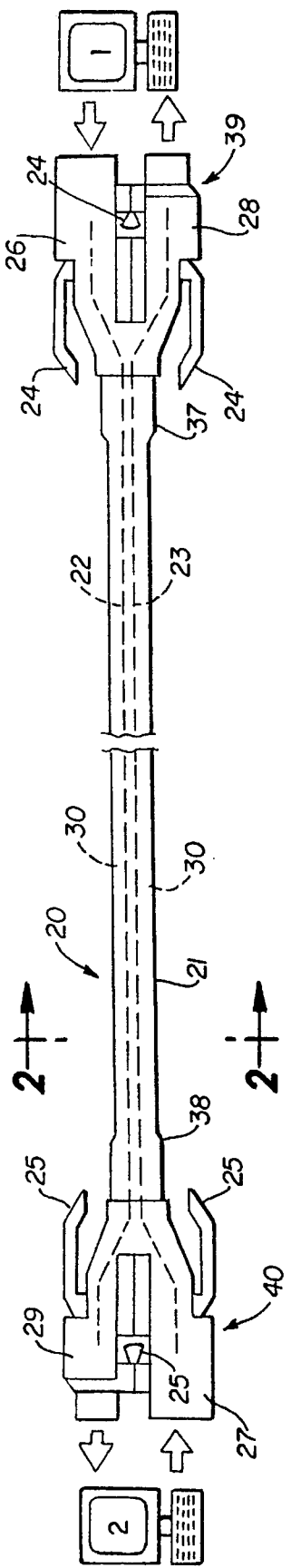
FIG. 1 shows a cross-sectional view of a conventional single-mode FDDI cable.
Figure 4:
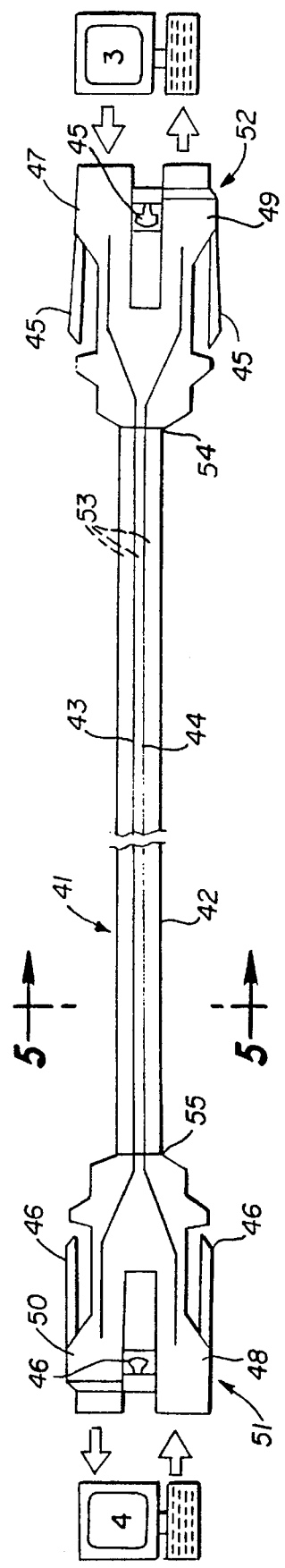
FIG. 4 shows a cross-sectional view of a conventional multi-mode FDDI cable.
Figure 5:
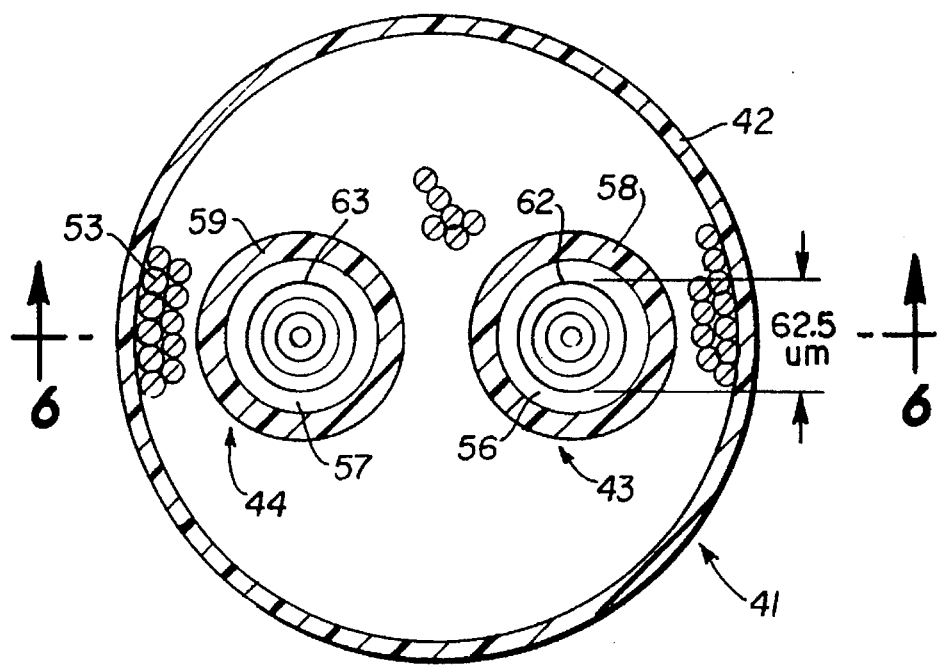
FIG. 5 shows a lateral cut-away view of a conventional multi-mode FDDI cable.
Figure 6:
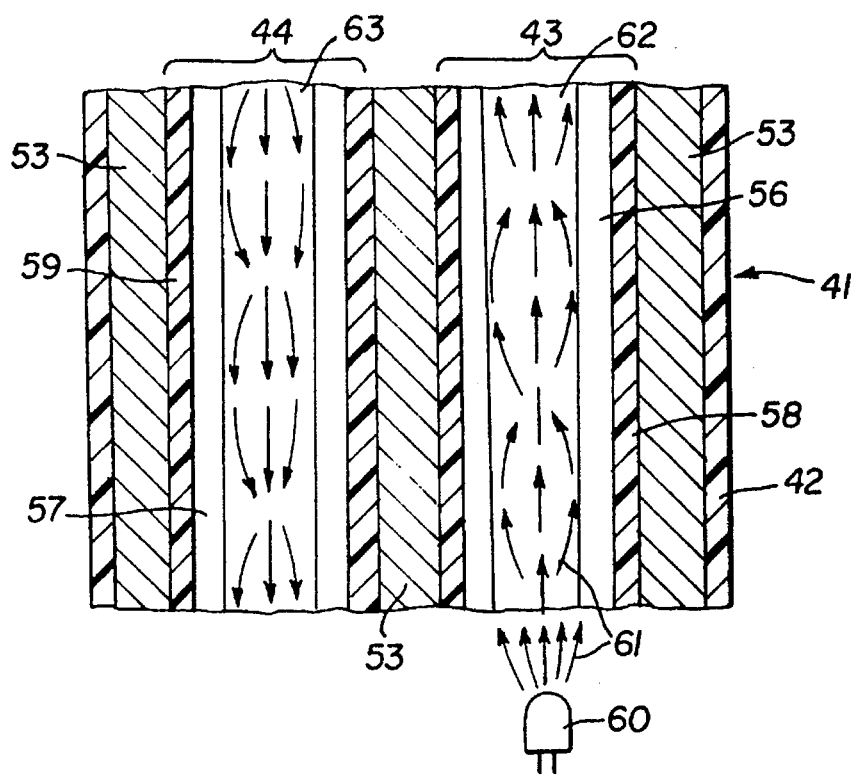
FIG. 6 shows a longitudinal cut-away view of a conventional multi-mode FDDI cable.
Figure 7:
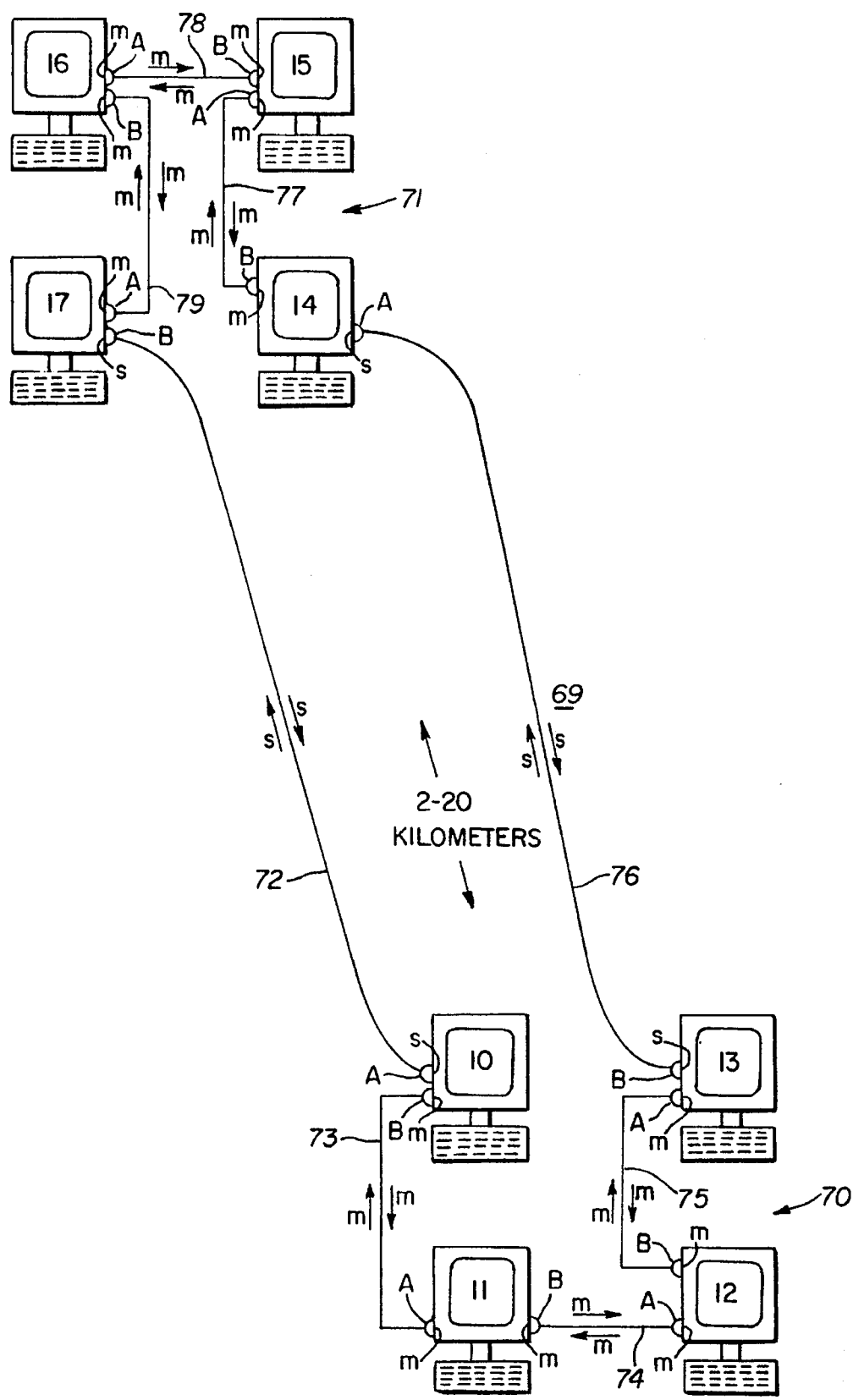
FIG. 7 shows a schematic diagram of a typical FDDI network, including single-mode and multi-mode connections between nodes.
Figure 12:
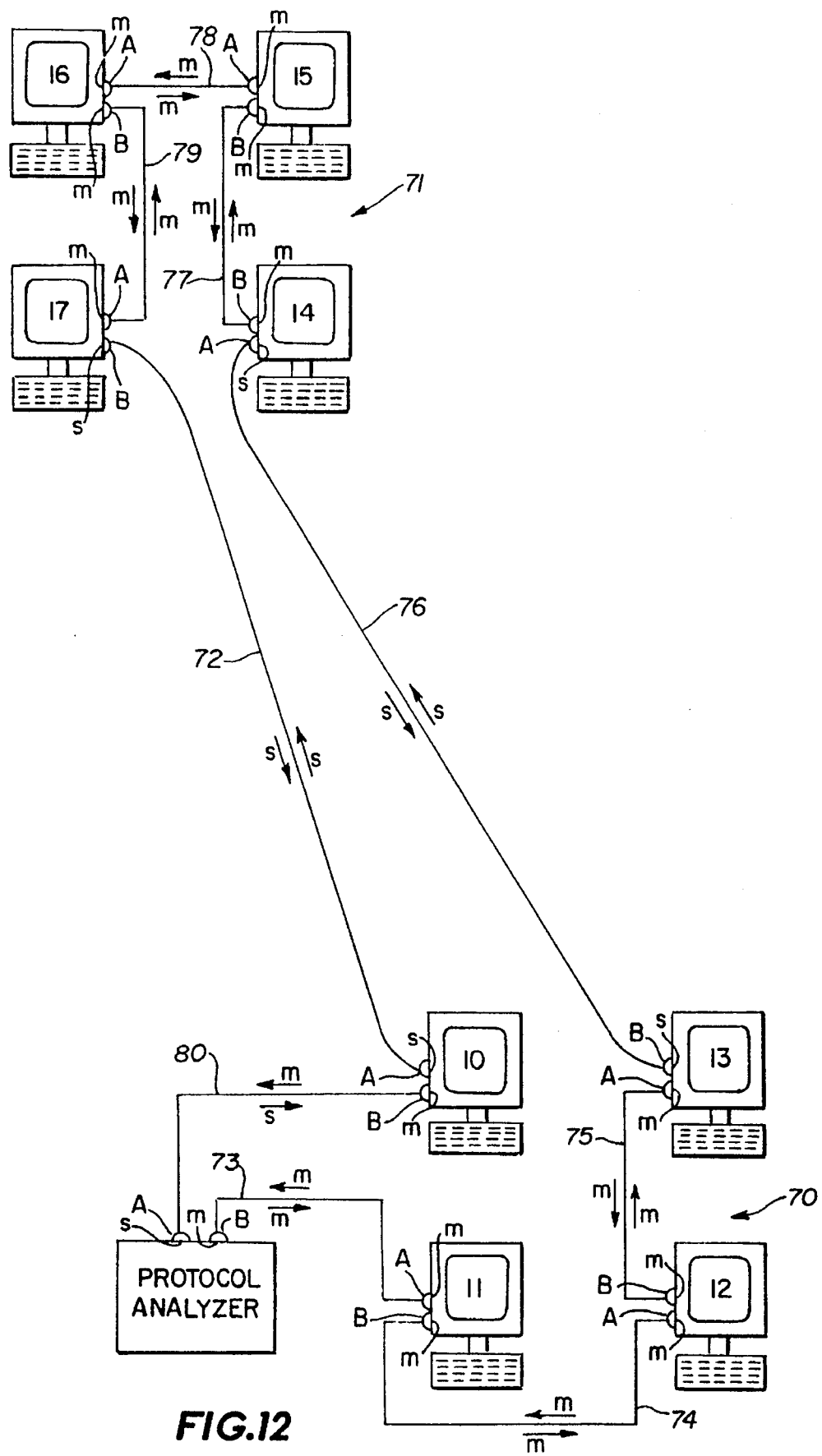
FIG. 12 shows a schematic diagram of a second implementation of a mixed fiber FDDI cable in a network.

FIG. 12 shows a similar schematic diagram of the network of FIG. 7 with a Protocol Analyzer inserted between nodes 10 and 11. In FIG. 12, multi-mode cable 73 is used to connect the multi-mode transceiver A of node 11 to the multi-mode transceiver B of the Protocol Analyzer. The mixed fiber cable 80 of the present invention is used to connect the multi-mode transceiver B of node 10 and the single-mode transceiver A of the Protocol Analyzer. The beauty of the mixed fiber cable is illustrated in FIGS. 11 and 12. Specifically, the mixed fiber cable allows for direct communication between a multi-mode transceiver and a single-mode transceiver. In this particular example, this is advantageous as the Protocol Analyzer will only need two transceivers, a multi-mode and a single-mode, and it will be able to connected between either two multi-mode nodes or two single-mode nodes. However, this is not the only use for the cable. If, for example, there is a reshuffling of the various nodes of a network or of several networks, these nodes can now be connected regardless of what type of transceivers the various nodes already have; all that is needed is the mixed fiber cable.

The foregoing description of the invention has been presented for purposes of illustration and description. It will be readily apparent to one of ordinary skill in the art that the mixed fiber optic cable can be used in different situations to directly connect a multi-mode transceiver of a first node with a single-mode transceiver of a second node. The foregoing description is not intended to be exhaustive or to limit the invention to the precise embodiment and use disclosed, and other modifications and variations may be possible in light of the above teachings, especially as changes in future duplex fiber cables and connector standards occur. The embodiments of the disclosure were chosen and described in order to best explain the principles of the invention and its practical applications to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A device that permits direct communication between a first node transmitting across first type of optical media and a second node transmitting across a second type of optical media, said device comprising;

a mixed fiber cable comprising a first type of optical media and a second type of optical media, said mixed fiber cable having a first end and a second end;

a first type of optical transceiver optically coupled to said first type of optical media at said first end of said mixed fiber cable and capable of transmitting an optical signal across said first type of optical media, said first type of optical transceiver coupled to said second type of optical media at said first end mixed fiber cable and capable of receiving an optical signal from said second type of optical media; and a second type of optical transceiver optically coupled to said second type of optical media at said second end of said mixed fiber cable and capable of transmitting an optical signal across said second type of optical media, said second type of optical transceiver coupled to said first type of optical media at said second end of said mixed fiber cable and capable of receiving an optical signal from said first type of optical media, wherein said first node transmits a signal by means of a laser diode through said first type of optical transceiver, across said first type optical media and toward a receiver in said second type of optical transceiver and a second node transmits a signal by means of a light emitting diode through said second type of optical transceiver, across said second type of optical media and toward a receiver in said first type of optical transceiver, wherein said mixed fiber cable comprises a single-mode optic fiber and a multi-mode optic fiber.

2. A mixed fiber cable for directly coupling a transceiver of a first node to a transceiver of a second node, wherein the transceiver of the first node transmits a signal of a first type and the transceiver of the second node transmits a signal of a second type, said cable comprising:

a first fiber that propagates a signal of a first type, said first fiber having a first end and a second end;

a second fiber that propagates a signal of a second type, said second fiber having a first end and a second end;

a first transceiver connector keyed to couple with said transceiver of said first node, said first connector having a transmitting fiber termination and a receiving fiber termination, wherein said first end of said first fiber is coupled to said transmitting fiber termination of said first connector and said first end of said second fiber is coupled to said receiving fiber termination of said first connector; and a second transceiver connector keyed to couple with said transceiver of said second node, said second connector having a transmitting fiber termination and a receiving fiber termination, wherein said second end of said second fiber is coupled to said transmitting fiber termination of said second connector and said second end of said first fiber is coupled to said receiving fiber termination of said second connector.

3. The mixed fiber cable according to claim 2 wherein said transceiver of said first node is a multi-mode transceiver and said transceiver of said second node is a single-mode transceiver.

4. The mixed fiber cable according to claim 3 wherein said first transceiver connector is a multi-mode transceiver connector and said second transceiver connector is a single-mode transceiver connector.

5. The mixed fiber cable according to claim 4 wherein said first fiber is a multi-mode optical fiber and said second fiber is a single-mode optical fiber.

6. A method of performing data transfers directly between a single-mode communications transceiver of a first FDDI node and a multi-mode communications transceiver of a second FDDI node, said method comprising the steps of:

(a) coupling a single-mode transceiver connector of a mixed fiber cable to said single-mode transceiver of said first FDDI node;

(h) coupling a multi-mode transceiver connector of said mixed fiber cable to said multi-mode transceiver of said second FDDI node;

(c) emitting a laser signal comprising information to be transferred from inside said single-mode transceiver of said first FDDI node into said single-mode transceiver connector to a single-mode optical fiber of said mixed fiber cable;

(d) propagating said laser signal along said single-mode optical fiber toward said multi-mode transceiver connector of said mixed fiber cable;

(e) receiving said laser signal at said multi-mode transceiver connector of said mixed fiber cable;

(f) passing said laser signal from said multi-mode transceiver connector to said multi-mode transceiver of said second FDDI node; and (g) detecting said laser signal received at said multi-mode transceiver of said second FDDI node.

7. A method of performing data transfers directly between single-mode communications transceiver of a first FDDI node multi-mode communications transceiver of a second FDDI node, said method comprising the steps of;

(a) coupling a single-mode transceiver connector of a mixed fiber cable to said single-mode transceiver of said first FDDI node;

(b) coupling a multi-mode transceiver connector of said fiber cable to said multi-mode transceiver of said second FDDI node;

(c) emitting a light signal comprising information to be transferred from inside said multi-mode transceiver of said second FDDI node into said multi-mode transceiver connector to a multi-mode optical fiber of said mixed fiber cable;

(d) propagating said light signal along said multi-mode optical fiber toward said single-mode transceiver connector of said fiber cable;

(e) receiving said light signal at said single-mode transceiver connector of said mixed fiber cable;

(f) passing said light signal from said single-mode transceiver connector to said single-mode transceiver of said first FDDI node; and (g) detecting said light signal received at said single-mode transceiver of said first FDDI node.

* * * * *